United States Patent Office 2,934,759
Patented Apr. 26, 1960

2,934,759
RADAR TARGET SIMULATOR

Frank B. Uphoff, Churchville, Pa., assignor to the United States of America as represented by the Secretary of the Navy Application May 1, 1958, Serial No. 732,405

10 Claims. (Cl. 343—17.7)

(Granted under Title 35, U.S. Code (1952), sec. 266)

The invention herein described may be manufactured and used by or for the Government of the United States of America for governmental purposes without any payment of royalties thereon or therefor.

The present invention relates to a radar target simulator and more particularly to a radar target simulator for generating an artificial target which closely resembles the essential characteristics of a real target.

In order to maintain optimum performance of an overall radar system, various ancillary devices are employed to ascertain the functional merits of associated component equipment. In this respect, test sets for making power and sensitivity measurements are an invaluable adjunct. As an aid to the training of radar operators or to determine their alertness, various types of radar target simulators have been designed. A known type employs a perforated sheet of otherwise opaque material which is interposed between a light source and a photoelectric cell. Video signals corresponding to the perforations are developed and supplied to the circuits of the plan position indicator (PPI) where they are viewed. While each of the devices of the prior art performs a useful function, they fail to fulfill the specific need of an instrumentality for readily determining the relative overall operational efficiency of a radar system under conditions closely simulating actual receptive conditions. Devices of the prior art do not provide for an adequate test signal such that it is comparable in characteristics with those of a real target.

Apropos of the deficiencies of the prior art, the inventive instrumentality provides for the generation of a pulse modulated RF signal which closely simulates the essential characteristics of a real target signal. Provision is made for conforming the character of the RF signal with radar antenna pattern beamwidth. Appropriate structure responsive to antenna position is also provided for injection of the simulated target signal into the RF section of the radar system at arbitrary azimuth. In addition, the instant invention embodies trigger delay means in order to simulate target range. Thus, as herein summarily set forth, the inventive radar target simulator not only provides for tunable elements of the radar system to be peaked for best operation, but also, operator alertness may be monitored at any time. Hence, in this manner, the maintenance of optimum overall operational efficiency of a radar system is more readily achieved.

An object of the present invention is the provision of a radar target simulator for generating an artificial target which closely simulates the essential characteristics of the real target.

Another object is to provide a radar target simulator for generating an artificial target having specific characteristics which conform with radar antenna pattern beamwidth.

A further object of the invention is the provision of a radar target simulator for generating an artificial target which may be injected into the radar system for presentation on a PPI screen at arbitrary azimuth and range.

Still another object is to provide a radar target simulator for generating a pulse modulated RF signal in which characteristics corresponding to radar antenna pattern beamwidth may be selectively controlled.

A final object of the present invention is the provision of a radar target simulator for generating a pulse modulated RF signal which may be injected into the RF section of the radar system as a test signal for simultaneous viewing on a PPI screen at arbitrary azimuth and range with radar video signals.

The exact nature of this invention as well as other objects and advantages thereof will be readily apparent from consideration of the following specification relating to the annexed drawing in which.

Figure 1:
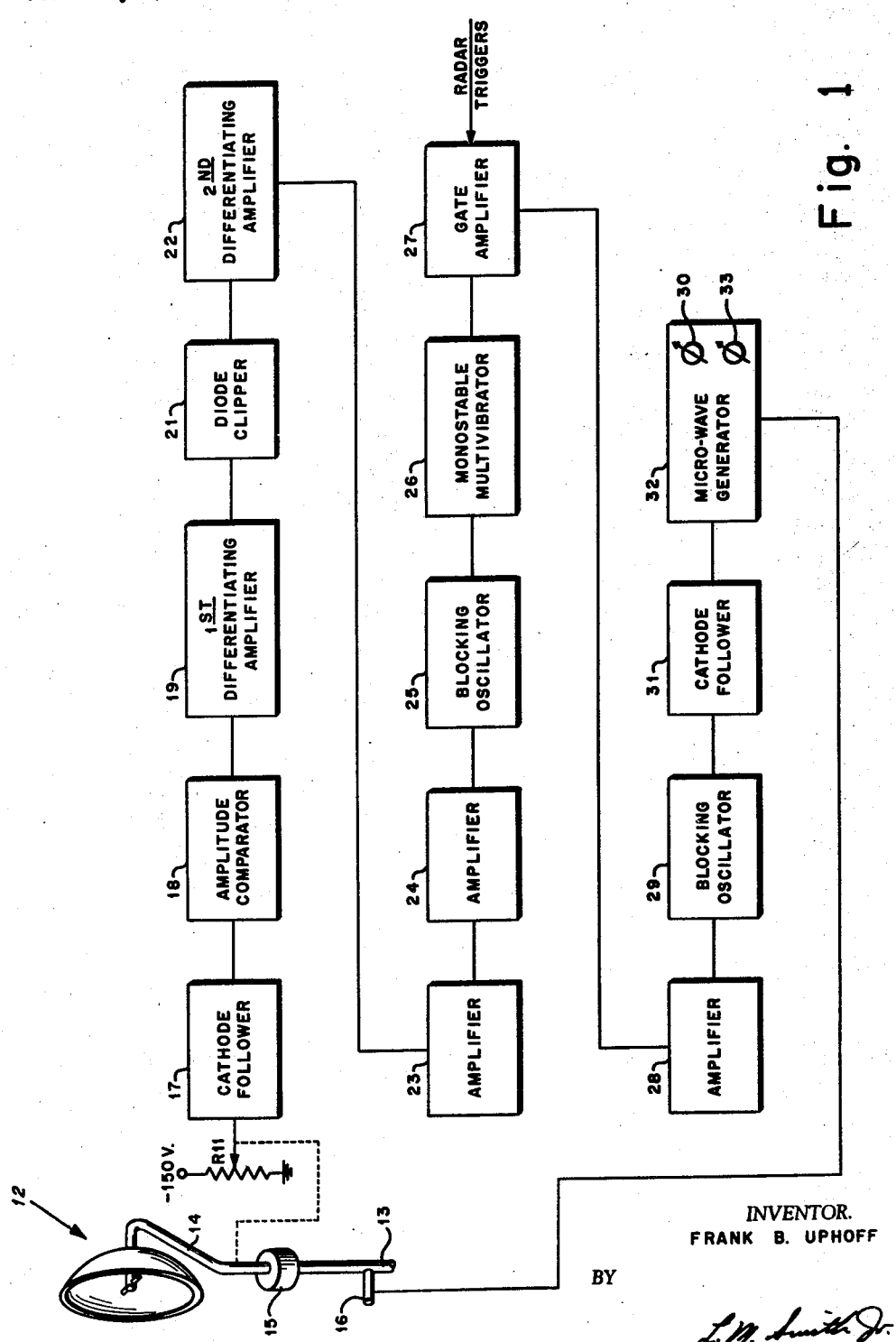
Fig. 1 is a functional block diagram of a preferred embodiment of the radar target simulator, illustrating in particular the cooperative relation of the inventive apparatus with specific elements of a radar system.

Referring now to the drawings, wherein like reference characters designate like or corresponding parts throughout the several views, there is shown in Fig. 1 a potentiometer R11 of a type designed for continuous rotation. The wiper of this potentiometer is illustrated to derive its rotation from the radar antenna assembly 12 as represented by the dotted line notation. The antenna assembly 12 of a search radar system is schematically illustrated in Fig. 1 to comprise a stationary RF transmission line 13 which is coupled to rotary feeder 14 by means of a rotating joint, not herein illustrated. Numeral 15 designates conventional driving means for driving the antenna. A directional coupler 16 is employed for injecting the RF signal generated by the inventive apparatus. It should be understood that rotation of the wiper of potentiometer R11 may be obtained elsewhere. For example in radar systems wherein a rotating deflection yoke is employed, the potentiometer wiper may be suitably mechanically connected to the mechanism which drives the yoke.

With respect to Fig. 1, it is evident that a voltage representative of azimuthal antenna position will be developed. Cathode follower 17 accepts this voltage and supplies it at low impedance to amplitude comparator 18. This latter stage produces a signal which is displaced in time position coterminously with selected azimuthal antenna position. This signal is subjected to waveshaping by a first differentiating amplifier 19, diode clipper 21, and a second differentiating amplifier 22. Successive amplification is performed by amplifier stages 23 and 24, rendering the signal of proper amplitude and phase for firing blocking oscillator 25. A spikelike voltage excursion is produced which causes monostable multivibrator 26 to develop a substantially squarewave pulse having a time duration conforming with antenna pattern beamwidth. This squarewave voltage serves as a conditioning level for gate amplifier 27, which is coupled to a source of periodically recurring radar triggers, available in the radar set, for example, at the pulse synchronizer unit thereof. Amplifier 27 thereby becomes receptive, allowing a discrete number of radar triggers to be accepted. These triggers are inverted and amplified by amplifier 28, which initiates operation of blocking oscillator 29. A corresponding burst of spikelike voltage excursions is produced. Cathode follower 31 besides serving an isolation function supplies these excursions at low impedance to microwave generator 32, which incorporates an amplitude control 30 and a delay control 33. The pulse modulated RF signal developed by generator 32 is fed to directional coupler 16.

Figure 2:
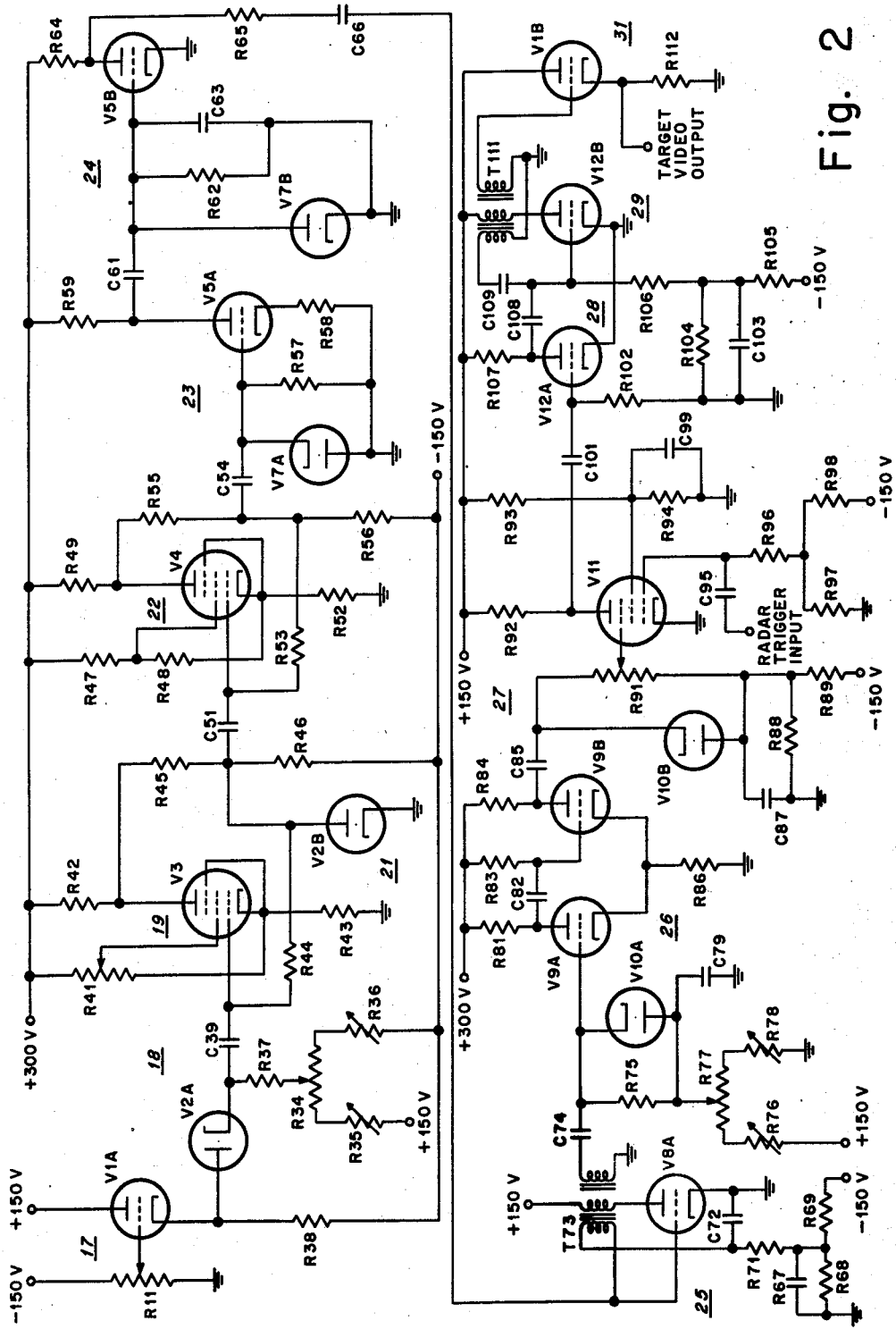
Fig. 2 is an electrical schematic diagram of the principally novel structure of the inventive radar target simulator.

Referring next to Fig. 2 wherein the pertinent structural details of the inventive apparatus are more particularly set forth, the grid element of section V1A of cathode follower 17 is connected to the wiper of potentiometer R11. With respect to the nomeclature herein utilized, V1A and V1B represent corresponding sections of a vacuum tube having a double set of elements. A low impedance replica of the voltage across R11 is developed across R38. Amplitude comparator 18 employing a diode V2A effects comparison of the voltage across R38 with a predetermined bias level established by the position of the wiper of potentiometer R34. The bias available across R34 falls within a potential range which corresponds with 0° to 360° of antenna rotation. Potentiometers R35 and R36 which are connected in series therewith precisely establish the limits of this potential range, with R37 comprising the principal load for stage 18. Successive differentiation of the output voltage of comparator 18 is performed by differentiating feedback amplifier stages 19 and 22 rather than by passive resistive-capacitive elements. Because of the relatively long pulse periods involved, the use of passive elements for differentiation fails to produce an acceptable output. A proportionate amount of voltage feedback is coupled through R44 and R53 to the respective inputs of these pentode stages. Potentiometer R41 furnishing screen voltage for the first differentiating amplifier 19 is adjusted to render the junction of R45 and R46 at approximately zero potential. The diode clipper 21 is employed to furnish a low impedance path, shunting to ground any positive signal appearing at the anode of V2B. The output of the second differentiating amplifier 22 appears at the junction of R55 and R56, being fractionated according to the ratio of the value of these resistances. Amplifiers 23 and 24 are entirely conventional, each utilizing a D.C. restorer at the respective inputs thereof. Diode V7A with coupling capacitor C54 and resistor R57 provide for positive clamping of the signal at the grid input of V5A, while in comparable manner, diode V7B with C61 and R62 provide negative clamping for amplifier 24. C63 improves the waveform appearing across grid load resistor R62. Blocking oscillator 25 is normally quiescent by virtue of a cutoff bias supplied from a biasing voltage divider, R68 and R69, through R71. The blocking oscillator is triggered into operation by the aforesaid waveform which is coupled through the impedance comprising R65 and C66. R65 functions as an isolation resistor, which minimizes interaction between amplifier 24 and blocking oscillator 25. A transformer T73 having a tertiary winding is used, a sharp spikelike voltage being developed in the output winding thereof. Monostable multivibrator 26 is capacitively coupled by C74 to the output winding of transformer T73 and produces a positive substantially squarewave output voltage having a duration determined by the RC time constant of C82, R83, and the bias potentiometer R77, the latter serving as an antenna pattern beamwidth control. A D.C. restorer V10A is employed to remove effects of averaging by C74. The gate amplifier 27 which follows is rendered conductive only during the interval when multivibrator 26 produces a positive monostable pulse. The suppressor grid of V11 is tied to a negative point on a divider consisting of R88 and R89. Positive clamping of the signal is provided at a level determined by the potential at the junction of these resistors. The potentiometer R91 precisely controls conduction through pentode V11. Positive radar triggers occurring at the pulse repetition frequency (PRF) are impressed on the grid input through C95. The plate resistor R92 is the load for this stage across which amplified radar triggers of negative polarity are developed. Amplifier 28 comprising a conventional triode stage functions essentially as a phase inverter which is instrumental in triggering blocking oscillator 29 into operation. The blocking oscillator 29 is normally quiescent until pulsed and employs a tertiary wound transformer T111 as in the previous instance. A cathode follower 31 accepts the positive spikelike voltage from the output winding of T111 and develops a low impedance replica of this signal across cathode resistor R112.

The signal developed across R112 is supplied as a modulating pulse to microwave generator 32, illustrated in Fig. 1. Generator 32 in Fig. 1 may be of conventional design employing a tunable klystron or other type of oscillator means. Numeral 30 represents an output control effective to control the amplitude of the RF output signal. The RF attenuation means incorporated in generator 32 may comprise simply a flap type attenuator, or may be a movable coupling loop which supplies an RF signal proportional with the degree of coupling with the field in the klystron. Control 33 represents a pulse delay control utilized to effect a predetermined amount of delay relative to the radar triggers, thereby providing for target range in the simulated target signal. This delay may be conventionally obtained by means of a Miller integrating circuit, phantastron, or other type of linear delay circuit such as the monostable multivibrator 26 of the instant invention. The modulated RF output of microwave generator 32 is fed to directional coupler 16 wherein unilateral injection of the signal takes place.

Figure 3:
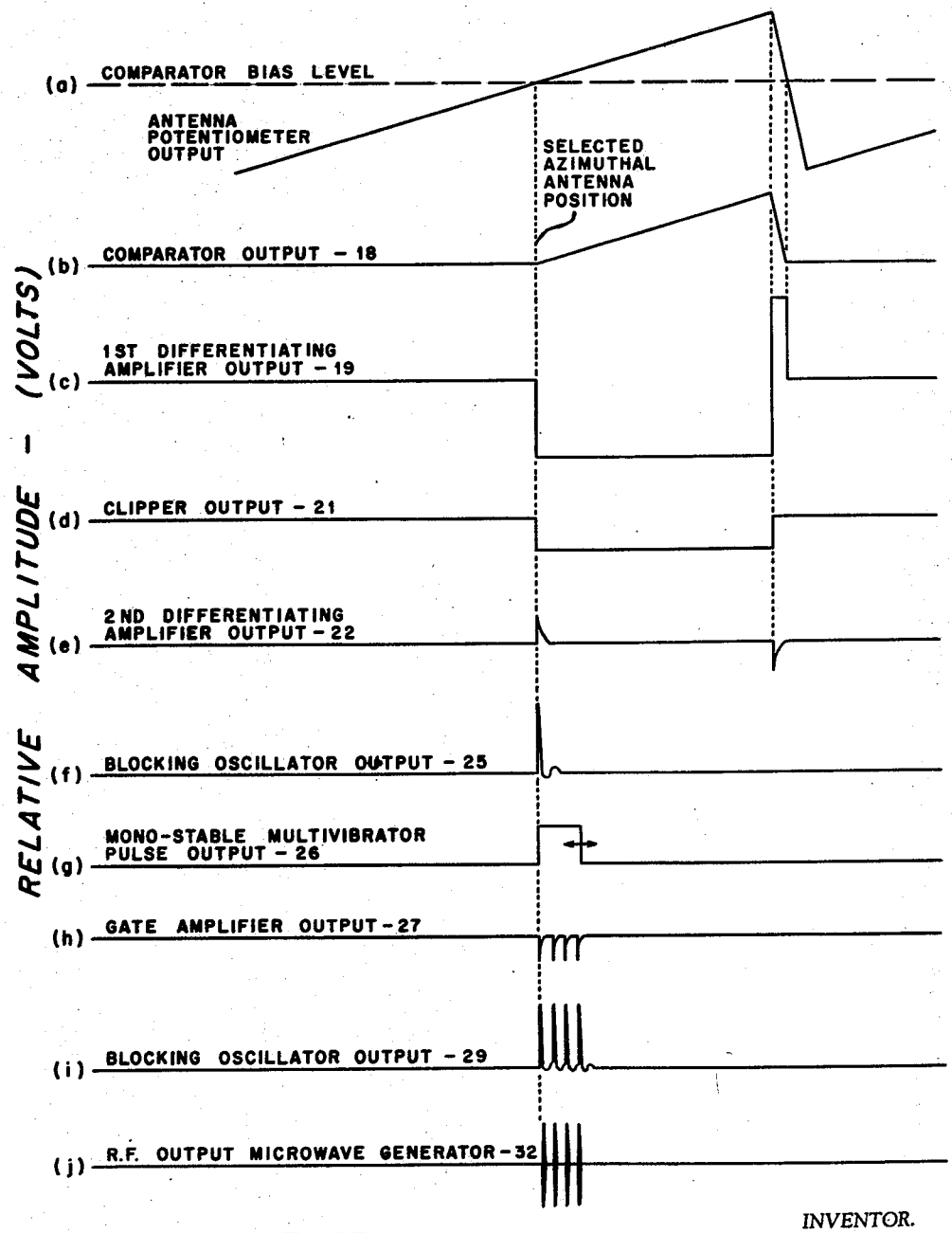
Fig. 3 depicts a timing chart showing in relative amplitude and timing relation the various waveforms which are developed in the radar target simulator.

Operation of the inventive radar target simulator is best set forth in connection with waveforms *a* through *j* depicted in relative amplitude and time relation in Fig. 3. With reference to Fig. 1, a sawtooth voltage waveform *a* in Fig. 3 is developed linearly with rotation of the antenna assembly 12 at the wiper of potentiometer R11. This sawtooth voltage is supplied to cathode follower 17. A low impedance replica of this voltage appears across R38 in Fig. 2 and is applied to the anode of V2A of amplitude comparator 18. Depending on the setting of bias potentiometer R34, V2A remains in a non-conductive state until the sawtooth voltage exceeds the comparator bias level, indicated in Fig. 3. When the anode of V2A is positive relative to its cathode, the diode conducts and a comparator output voltage, waveform *b*, is developed across R37. Hence, the sawtooth waveform *b* is initiated as a function of the bias setting of R34 and antenna position. Thus, R34 performs the function of azimuth control effective to insert the simulated target signal at any desired azimuth.

The first differentiating amplifier 19 operates on the sawtooth waveform *b* and produces a voltage which is substantially squarewave in character, as indicated by waveform *c* in Fig. 3. Waveform *d* is representative of the negative pulse voltage appearing at the anode of diode clipper 21, any signal of positive polarity being shunted to ground through the diode. The second differentiating amplifier 22 performs differentiation of the leading and trailing edges of the voltage waveform *d*, the resulting voltage excursions being indicated by waveform *e*. The indicated reversal in phase is opposite to the differentiated signal that would be obtained ordinarily by passive RC elements due to the amplification and phase reversal of V4.

The spikelike excursions represented by waveform *e* undergo successive amplification by amplifier stages 23 and 24, appearing across R64 substantially unchanged except for increase in amplitude. Since only the positive excursion is of significance, the negative having no effect, the leading edge of the positive excursion of waveform *e* triggers blocking oscillator 25 into operation. A regenerative action takes place in the windings of transformer T73 further driving the grid of V8A positive until saturation of the transformer results. A sharp positive spike voltage represented by waveform *f* is produced in the output winding of T73 and drives the monostable multivibrator 26 into operation. V9A which is normally cutoff is initiated into plate current conduction, while V9B normally conducting is now cutoff until such time when C82 discharges sufficiently through R83 to allow the grid of V9B to again cause conduction in V9B. Grid bias for V9A is controlled by R77 which precisely controls conduction time or width of the output pulse represented by waveform g, the trailing edge of this waveform being indicated as variable relative to the time base.

The squarewave voltage represented by waveform g is applied across R91, a proportionate amount depending on the setting of this potentiometer is supplied as a gating voltage to the suppressor grid of gate amplifier 27. This voltage is clamped at a level established by the potential at the junction of R88 and R89. Hence, pentode V11 remains cutoff except during the interval when the voltage waveform g becomes sufficiently positive. The control grid of V11 is continuously supplied with positive radar triggers and a number of these appear as inverted negative triggers across R92 when plate current flows for the duration of the applied gating voltage. Thus, it will become evident that the beamwidth of the radar antenna will be closely simulated, the number of "target hits" being a function of the duration of the monostable output voltage of multivibrator 26.

The output of gate amplifier 27 is represented by waveform h. This voltage analogous to target video is amplified by amplifier 28, and the positive target video developed across R107 fires blocking oscillator 29 into operation. As in the previous instance, positive spikelike signals are developed as indicated by waveform i. These are applied to cathode follower 31, which drives microwave generator 32. A burst of modulated RF pulses coterminous with repetition rate and frequency of the radar system are produced as represented by waveform j. The RF pulses are fed into directional coupler 16 of the RF section of the radar system and are subsequently observed on the PPI screen as detected video signals compatible with the regular radar video.

Hence, in the manner set forth the radar target simulator provides for the generation of artificial target video which closely resembles the essential characteristics of real target video. The artificial target video conforms to radar antenna pattern beamwidth and may be selectively injected into the RF section of the radar system at arbitrary range and azimuth. Not only may tunable elements of the radar system by peaked for best operation, but also, operator alertness may be monitored at any time. Thus, the radar target simulator of the instant invention provides for the maintenance of optimum overall efficiency of a radar system.

While the inventive radar target simulator is of a basic design and suffices for most applications, it may be desirable in specific instances to provide for target video subject to continuously variable delay, in order to simulate a moving target. It is deemed within the skill of one in the art to supply such means. In its simplest form, such means may be an electric motor for driving the delay means of microwave generator 32. Furthermore, though the target video produced by the inventive radar target simulator is of constant amplitude, it may be desirable to conform the target video with antenna beam pattern and target aspect. Thus, to effect alternation of signal quality due to the reflection process, beam pattern amplitude modulation could be added if desirable. The amplitude modulation may be conveniently inserted in series with the cathode lead of gate amplifier 27.

The following tabulation lists illustrative values of electrical components used in the preferred embodiment:

| | | |
|---|---|---|
| C66, C67, C95, C101, C103 | μf | .01 |
| C87, C99 | μf | .1 |
| C51, C54, C61, C85 | μf | 1 |
| C74 | μf | .05 |
| C82 | μf | .03 |
| C63 | μf | .022 |
| C39 | μf | 2 |
| C79 | μf | 16 |
| C108 | μμf | 100 |
| C72, C109 | μμf | 250 |
| R43, R52 | | 160 |
| R58 | | 1K |
| R86 | | 4K |
| R112 | | 4.7K |
| R81, R84 | | 5K |
| R34, R68, R78, R104 | | 10K |
| R97 | | 16K |
| R71, R106 | | 18K |
| R11, R38, R47, R77 | | 20K |
| R37 | | 22K |
| R64 | | 24K |
| R35, R36 | | 25K |
| R59 | | 27K |
| R88 | | 39K |
| R93 | | 47K |
| R41 | | 50K |
| R42, R49, R75 | | 51K |
| R65, R92, R96, R102, R107 | | 56K |
| R57, R62, R94 | | 100K |
| R76 | | 136K |
| R89 | | 150K |
| R48 | | 270K |
| R69, R98, R105 | | 390K |
| R45, R46, R55, R56 | | 470K |
| R44, R53 | | 1M |
| R91 | | 2M |

T73, T111, tertiary wound blocking oscillator transformer.

| | |
|---|---|
| V1, V5, V9 | 12AT7 |
| V2, V7, V10 | 6AL5 |
| V3, V4 | 6AH6 |
| V8, V12 | 12AU7 |
| V11 | 6AS6 |

*Legend* f. = farads
μf = microfarad
K = $10^3$
M = $10^6$
All resistors in ohms

It should be understood, of course, that the foregoing disclosure relates to only a preferred embodiment of the invention and that numerous modifications or alterations may be made therein without departing from the spirit and the scope of the invention as set forth in the appended claims.

What is claimed is:

1. In a radar system, a radar target simulator for generating a target signal closely simulating the characteristics of a real target comprising, potentiometer means for producing a voltage proportional in magnitude to instantaneous azimuthal antenna position, voltage comparator means including a diode responsive to said voltage to initiate a signal at an azimuth displaced in time position coterminously with a selected azimuthal antenna position, differentiating amplifier means including feedback means responsive to the voltage comparator means to convert said signal into at least one differentiated pulse conforming in time position with the selected azimuthal antenna position, means responsive to said differentiated pulse to produce a sharp spikelike voltage, monostable means responsive to the spikelike voltage to develop a gating potential of substantially constant level for a time duration corresponding with antenna pattern beamwidth, gating means adapted to be coupled to a source of periodically recurring radar triggers and operably conditioned by the gating potential of said monostable means to permit said gating means to select a discrete number of said radar triggers, impedance transformation means including a blocking oscillator responsive to said gating means to convert the selected radar triggers into spikelike voltage excursions of low driving impedance, and microwave generator means including selective amplitude and delay means responsive to the spikelike voltage excursions to generate a burst of modulated radio frequency pulses which are supplied to the radio frequency input of the radar system, the modulated radio frequency pulses thereby being of a character closely simulating the characteristics of real target signals.

2. In a radar system, a radar target simulator for generating a target signal closely simulating the characteristics of a real target comprising, potentiometer means for producing a voltage proportional in magnitude to instantaneous azimuthal antenna position, voltage comparator means responsive to said voltage including a diode having an element biased at a level corresponding to a selected azimuthal antenna position and operable to initiate a signal at an azimuth displaced in time coterminously with the selected antenna position, differentiating amplifier means including feedback means responsive to the voltage comparator means to convert said signal into at least one differentiated pulse conforming in time position with the selected azimuthal antenna position, means responsive to said differentiated pulse to produce a sharp spikelike voltage, monostable means responsive to the spikelike voltage to develop a gating potential of substantially constant level for a time duration corresponding with antenna pattern beamwidth, gating means adapted to be coupled to a source of periodically recurring radar triggers and operably conditioned by the gating potential of said monostable means to permit said gating means to select a discrete number of said radar triggers, means responsive to said gating means to convert the selected radar triggers into spikelike voltage excursions of low driving impedance, and microwave generator means including selective amplitude and delay means responsive to the spikelike voltage excursions to generate a burst of modulated radio frequency pulses which are supplied to the radio frequency input of the radar system, the modulated radio frequency pulses thereby being of a character closely simulating the characteristics of real target signals.

3. In a radar system, a radar target simulator for generating a target signal closely simulating the characteristics of a real target comprising, potentiometer means for producing a voltage proportional in magnitude to instantaneous azimuthal antenna position, voltage comparator means responsive to said voltage to initiate a sawtooth signal at an azimuth displaced in time position coterminously with a selected azimuthal antenna position, differentiating amplifier means including feedback means responsive to the voltage comparator means to convert said sawtooth signal into at least one differentiated pulse conforming in time position with the selected azimuthal antenna position, means responsive to said differentiated pulse to produce a sharp spikelike voltage, monostable means responsive to the spikelike voltage to develop a gating potential of substantially constant level for a time duration corresponding with antenna pattern beamwidth, gating means adapted to be coupled to a source of periodically recurring radar triggers and operably conditioned by said gating potential to permit said gating means to select a discrete number of said radar triggers, means responsive to said gating means to convert the selected radar triggers into spikelike voltage excursions of low driving impedance, and microwave generator means including selective amplitude and delay means responsive to the spikelike voltage excursions to generate a burst of modulated radio frequency pulses which are supplied to the radio frequency input of the radar system, the modulated radio frequency pulses thereby being of a character closely simulating the characteristics of real target signals.

4. In a radar system, a radar target simulator for generating a target signal closely simulating the characteristics of a real target comprising, potentiometer means for producing a voltage proportional in magnitude to instantaneous azimuthal antenna position, voltage comparator means responsive to said voltage including a diode having an element biased at a level corresponding to a selected azimuthal antenna position to initiate a sawtooth signal at an azimuth displaced in time coterminously with the selected antenna position, differentiating amplifier means including feedback means responsive to said voltage comparator means to convert said sawtooth signal into at least one differentiated pulse conforming in time position with the selected antenna position, means including a blocking oscillator responsive to said differentiated pulse to produce a sharp spikelike voltage, monostable means responsive to the spikelike voltage to develop a gating potential of substantially constant level for a time duration corresponding with antenna pattern beamwidth, gating means adapted to be coupled to a source of periodically recurring radar triggers and operably conditioned by said gating potential to permit said gating means to select a discrete number of said radar triggers, impedance transformation means including a blocking oscillator responsive to said gating means to convert the selected radar triggers into spikelike voltage excursions of low driving impedance, and microwave generator means including selective amplitude and delay means responsive to the spikelike voltage excursions to generate a burst of modulated radio frequency pulses which are supplied to the radio frequency input of the radar system, the modulated radio frequency pulses thereby being of a character closely simulating the characteristics of real target signals.

5. In a radar system, a radar target simulator for generating a target signal closely simulating the characteristics of a real target comprising, means for producing a voltage having a magnitude proportional to instantaneous azimuthal position of a radar antenna, means responsive to said voltage to initiate a sawtooth signal at an azimuth displaced in time coterminously with a selected azimuthal antenna position, a first differentiating amplifier means including feedback means responsive to said sawtooth signal to produce a bistable voltage having stable upper and lower levels corresponding to the slopes of said sawtooth signal, a second differentiating amplifier means including feedback means responsive to said first differentiating amplifier means to produce at least one differentiated pulse conforming in time position with the selected azimuthal antenna position, a first amplifier means responsive to said second differentiating amplifier means to produce in the output thereof an amplified differentiated pulse of phase substantially unchanged relative to the input thereof, a first blocking oscillator responsive to said differentiated pulse to produce a spikelike voltage displaced in time position coincidentally with the selected azimuthal antenna position, a monostable device responsive to said spikelike voltage to develop a gating potential of substantially constant level for a time duration corresponding with antenna pattern beamwidth, gate amplifier means adapted to be coupled to a source of periodically recurring radar triggers and responsive to the gating potential of said monostable device to select a discrete number of said radar triggers, means including a second blocking oscillator responsive to the gate amplifier means to effect a corresponding number of spikelike voltage excursions at low output driving impedance, and microwave generator means including selective amplitude and delay means responsive to the spikelike voltage excursions to generate a burst of modulated radio frequency pulses which are supplied to the radio frequency input of the radar system, the modulated radio frequency pulses thereby being of a character closely simulating the characteristics of real target signals.

6. In a radar system, a radar target simulator for generating a target signal closely simulating the characteristics of a real target comprising, means for producing a voltage having a magnitude proportional to instantaneous azimuthal position of a radar antenna, means responsive to said voltage to initiate a sawtooth signal at an azimuth displaced in time coterminously with a selected azimuthal antenna position, a first differentiating amplifier means including feedback means responsive to said sawtooth signal to produce a bistable voltage having stable upper and lower levels corresponding to the slopes of said sawtooth signal, a second differentiating amplifier means including feedback means responsive to said first differentiating amplifier means to produce at least one differentiated pulse conforming in time position with the selected azimuthal antenna position, amplifier means responsive to said second differentiating amplifier means to produce in the output thereof an amplified differentiated pulse of phase substantially unchanged relative to the input thereof, blocking oscillator means responsive to said differentiated pulse to produce a spikelike voltage displaced in time position coincidentally with the selected azimuthal antenna position, a monostable device responsive to said spikelike voltage to develop a gating potential of substantially constant level for a time duration corresponding with antenna pattern beamwidth, gate amplifier means adapted to be coupled to a source of periodically recurring radar triggers and responsive to the gating potential of said monostable device to select a discrete number of said radar triggers, means responsive to the gate amplifier to effect a corresponding discrete number of amplified spikelike voltage excursions, a cathode follower responsive to the last-named means to supply in the output thereof the spikelike voltage excursions at low impedance, and microwave generator means including selective amplitude and delay means responsive to the output excursions of said cathode follower means to generate a burst of modulated radio frequency pulses which are supplied to the radio frequency input of the radar system, the modulated radio frequency pulses thereby being of a character closely simulating the characteristics of real target signals.

7. In a radar system, a radar target simulator for generating a target signal closely simulating the characteristics of a real target comprising, means for producing a voltage having a magnitude proportional to instantaneous azimuthal position of a radar antenna, means responsive to said voltage to initiate a sawtooth signal at an azimuth displaced in time coterminously with a selected azimuthal antenna position, a first differentiating amplifier means including feedback means responsive to said sawtooth signal to produce a bistable voltage having stable upper and lower levels corresponding to the slopes of said sawtooth signal, a second differentiating amplifier means including feedback means responsive to said first differentiating amplifier means to produce at least one differentiated pulse conforming in time position with the selected azimuthal antenna position, a first amplifier means responsive to said second differentiating amplifier means to produce in the output thereof an amplified differentiated pulse of phase substantially unchanged relative to the input thereof, a first blocking oscillator means responsive to said differentiated pulse to produce a spikelike voltage displaced in time position coincidentally with the selected azimuthal antenna position, a monostable device responsive to said spikelike voltage to develop a gating potential of substantially constant level for a time duration corresponding with antenna pattern beamwidth, gate amplifier means adapted to be coupled to a source of periodically recurring radar triggers and responsive to the gating potential of said monostable device to select a discrete number of said radar triggers, a second amplifier means responsive to the gate amplifier means to produce a corresponding number of amplified radar triggers, a second blocking oscillator means responsive to the amplified radar triggers to effect a corresponding number of spikelike voltage excursions, a cathode follower means responsive to the last-named blocking oscillator to supply in the output thereof the spikelike voltage excursions at low impedance, and microwave generator means including selective amplitude and delay means responsive to the output excursions of said cathode follower means to generate a burst of modulated radio frequency pulses which are supplied to the radio frequency input of the radar system, the modulated radio frequency pulses thereby being of a character closely simulating the characteristics of real target signals.

8. In a radar system, a radar target simulator for generating a target signal closely simulating the characteristics of a real target comprising, potentiometer means for producing a voltage having a magnitude proportional to instantaneous azimuthal position of a radar antenna, means responsive to said voltage to initiate a sawtooth signal at an azimuth displaced in time coterminously with a selected azimuthal antenna position, a first differentiating amplifier means including feedback means responsive to said sawtooth signal to produce a bistable voltage having stable upper and lower levels corresponding to the slopes of said sawtooth signal, means operable to provide a unidirectional low impedance path to the upper level of said bistable voltage to effect a substantially squarewave pulse, a second differentiating amplifier means including feedback means for differentiating said squarewave pulse to produce at least one differentiated pulse conforming in time position with the selected azimuthal antenna position, a first voltage amplifier means responsive to said second differentiating amplifier means to produce in the output thereof an amplified differentiated pulse of phase substantially unchanged relative to the input thereof, a first blocking oscillator means responsive to said differentiated pulse to produce a spikelike voltage displaced in time position coincidentally with the selected azimuthal antenna position, a monostable device responsive to said spikelike voltage to develop a gating potential of substantially constant level for a time duration corresponding with antenna pattern beamwidth, gate amplifier means adapted to be coupled to a source of periodically recurring radar triggers and responsive to the gating potential of said monostable device to select a discrete number of said radar triggers, a second voltage amplifier means responsive to the gate amplifier means to produce a corresponding number of amplified radar triggers, a second blocking oscillator means responsive to the amplified radar triggers to effect a corresponding number of spikelike voltage excursions, a cathode follower means responsive to the last-named blocking oscillator to supply in the output thereof the spikelike voltage excursions at low impedance, and microwave generator means including selective amplitude and delay means responsive to the output excursions of said cathode follower means to generate a burst of modulated radio frequency pulses which are supplied to the radio frequency input of the radar system, the modulated radio frequency pulses thereby being of a character closely simulating the characteristics of real target signals.

9. In a radar system, a radar target simulator for generating a target signal closely simulating the characteristics of a real target comprising, potentiometer means for producing a voltage having a magnitude proportional to instantaneous azimuthal position of a radar antenna, means responsive to said voltage including a diode having an element biased at a level proportionate to a selected azimuthal antenna position to initiate a sawtooth signal at an azimuth displaced in time coterminously with the selected azimuthal antenna position, a first differentiating amplifier means including feedback means responsive to said sawtooth signal to produce a bistable voltage having stable upper and lower levels corresponding to the slopes of said sawtooth signal, means operable to provide a unidirectional low impedance path to the upper level of said bistable voltage to effect a substantially squarewave pulse, a second differentiating amplifier means including feedback means for differentiating said squarewave pulse to produce at least one differentiated pulse conforming in time position with the selected azimuthal antenna position, a first voltage amplifier means responsive to said second differentiating means to produce in the output thereof an amplified differentiated pulse of phase substantially unchanged relative to the input thereof, a first blocking oscillator means responsive to said differentiated pulse to produce a spikelike voltage displaced in time position coincidentally with the selected azimuthal antenna position, a monostable device responsive to said spikelike voltage to develop a gating potential of substantially constant level for a time duration corresponding with antenna pattern beamwidth, gate amplifier means adapted to be coupled to a source of periodically recurring radar triggers and responsive to the gating potential of said monostable device to select a discrete number of said radar triggers a second voltage amplifier means responsive to the gate amplifier means to produce a corresponding number of amplified radar triggers, a second blocking oscillator means responsive to the amplified radar triggers to effect a corresponding number of spikelike voltage excursions, a cathode follower means responsive to the last-named blocking oscillator to supply in the output thereof the spikelike voltage excursions at low impedance, and microwave generator means including selective amplitude and delay means responsive to the output excursions of said cathode follower means to generate a burst of modulated radio frequency pulses which are supplied to the radio frequency input of the radar system, the modulated radio frequency pulses being of a character closely simulating the characteristics of real target signals.

10. In a radar system, a radar target simulator for generating a target signal closely simulating the characteristics of a real target comprising, potentiometer means for producing a voltage having a magnitude proportional to instantaneous azimuthal position of a radar antenna, means responsive to said voltage including a diode having an element biased at a level proportionate to a selected azimuthal antenna position to initiate a sawtooth signal at an azimuth displaced in time coterminously with the selected azimuthal antenna position, a first differentiating means including a feedback voltage amplifier responsive to said sawtooth signal to produce a bistable voltage having stable upper and lower levels corresponding to the slopes of said sawtooth signal, diode means operable to provide a unidirectional low impedance path to the upper level of said bistable voltage to effect a substantially squarewave pulse, a second differentiating means including a feedback voltage amplifier for differentiating said squarewave pulse to produce at least one differentiated pulse conforming in time position with the selected azimuthal antenna position, a first amplifier means responsive to said second differentiating means to produce in the output thereof an amplified differentiated pulse of phase substantially unchanged relative to the input thereof, a first blocking oscillator means responsive to said differentiated pulse to produce a spikelike voltage displaced in time position coincidentally with the selected azimuthal antenna position, a monostable device including a variable bias means responsive to said spikelike voltage to develop a gating potential of substantially constant level for a selectively variable time duration to permit correspondence with antenna pattern beamwidth characteristics, gate amplifier means adapted to be coupled to a source of periodically recurring radar triggers and responsive to the gating potential of said monostable means to select a discrete number of said radar triggers, a second amplifier means responsive to the gate amplifier means to produce a corresponding number of amplied radar triggers, a second blocking oscillator means responsive to the amplified radar triggers to effect a corresponding number of spikelike voltage excursions, a cathode follower means responsive to the last-named blocking oscillator to supply in the output thereof the spikelike voltage excursions at low impedance, and microwave generator means including selective amplitude and delay means responsive to the output excursions of said cathode follower means to generate a burst of modulated radio frequency pulses which are supplied to the radio frequency input of the radar system, the modulated radio frequency pulses being of a character closely simulating the characteristics of real target signals.

References Cited in the file of this patent

UNITED STATES PATENTS

| | | |
|---|---|---|
| 2,440,261 | Ginzton | Apr. 27, 1948 |
| 2,775,759 | Okrent | Dec. 25, 1956 |